United States Patent
Gradel et al.

(10) Patent No.: US 6,808,656 B2
(45) Date of Patent: Oct. 26, 2004

(54) METHOD OF PRODUCING A NUCLEAR FUEL SINTERED BODY

(75) Inventors: Gerhard Gradel, Forchheim (DE); Wolfgang Dörr, Herzogenaurach (DE)

(73) Assignee: Framatome ANP GmbH, Erlangen (DE)

(*) Notice: Subject to any disclaimer, the term of this patent is extended or adjusted under 35 U.S.C. 154(b) by 103 days.

(21) Appl. No.: 10/108,115

(22) Filed: Mar. 27, 2002

(65) Prior Publication Data
US 2002/0149125 A1 Oct. 17, 2002

(30) Foreign Application Priority Data
Mar. 27, 2001 (DE) .......................... 101 15 015

(51) Int. Cl.$^7$ .............................................. G21C 21/00
(52) U.S. Cl. ........................ 264/0.5; 264/43; 264/44; 264/674; 264/676
(58) Field of Search ....................... 264/0.5, 43, 44, 264/674, 676

(56) References Cited

U.S. PATENT DOCUMENTS

| | | | |
|---|---|---|---|
| 3,010,890 A | | 11/1961 | Jepson et al. |
| 4,505,882 A | * | 3/1985 | Hasegawa et al. .......... 423/261 |
| 4,572,810 A | * | 2/1986 | LeBlanc, Jr. ................. 264/0.5 |
| 4,643,873 A | * | 2/1987 | Hayes ......................... 252/643 |
| 4,869,866 A | | 9/1989 | Lay et al. |
| 4,869,867 A | | 9/1989 | Lay et al. |
| 5,514,306 A | * | 5/1996 | Larson et al. ................ 264/0.5 |
| 5,642,390 A | * | 6/1997 | Cura et al. ................... 376/419 |
| 5,882,552 A | * | 3/1999 | Song et al. ..................... 264/5 |

FOREIGN PATENT DOCUMENTS

| | | |
|---|---|---|
| EP | 0 316 623 A2 | 5/1989 |
| EP | 0 317 772 A2 | 5/1989 |
| EP | 0 317 774 A2 | 5/1989 |
| GB | 809693 | 3/1959 |
| JP | 55 087 993 A | 7/1980 |
| JP | 55 104 791 A | 8/1980 |
| JP | 55 151 292 A | 11/1980 |
| JP | 01 029 796 | 1/1989 |
| JP | 07 043 487 A | 2/1995 |
| WO | WO 97/43769 | 11/1997 |
| WO | WO 00/00985 | 1/2000 |

* cited by examiner

Primary Examiner—Christopher A. Fiorilla
(74) Attorney, Agent, or Firm—Laurence A. Greenberg; Werner H. Stemer; Ralph E. Locher (57) ABSTRACT

A nuclear fuel sintered body is produced from a powder which contains at least one fissile heavy metal oxide. During the further treatment of the powder over the course of the process preceding the sintering operation, a dopant that contains at least 100 ppm of an iron oxide compound is added to the powder. The powder is a $UO_2$-containing powder obtained from a dry-chemical conversion process, and if appropriate, a powder which contains further fissile heavy metal oxide ($U_3O_8$, $PuO_2$, inter alia). As a result, the sintered body is provided with high plasticity combined, at the same time, with a large grain size. This advantageously reduces an interaction between the nuclear fuel sintered body and a fuel rod cladding tube during an operation of the reactor.

39 Claims, 8 Drawing Sheets

METHOD OF PRODUCING A NUCLEAR FUEL SINTERED BODY

BACKGROUND OF THE INVENTION

FIELD OF THE INVENTION

The invention lies in the nuclear fuel production technology and relates, more specifically, to a method of producing a nuclear fuel sintered body. In the process, a powder that contains a fissile heavy metal oxide is produced, treated further, and sintered.

For nuclear reactors, nuclear fuels are generally provided in fuel assemblies. Depending on the type of reactor, these assemblies may have different structures and geometric forms (e.g. plates or rods). In conventional light water reactors, nuclear fuels are provided in the form of fuel rods which are combined in bundles to form a fuel assembly. The fuel rods are thereby generally arranged along a fuel assembly axis and are in each case guided through the meshes of a spacer in a plurality of planes perpendicular to the fuel assembly axis. As a result, they are laterally spaced apart and are mounted with partial resilience. Water generally flows from below onto the fuel assemblies arranged next to one another in a light water reactor core, and the water dissipates the heat generated in the nuclear fuel by the nuclear fission process and, at the same time, acts as a neutron moderator. The term light water reactors is to be understood as encompassing all reactors which operate with light water as a coolant, in particular boiling water reactors, pressurized water reactors, and also Soviet-design reactors (VVER reactors).

The cladding tube of a fuel rod which surrounds the nuclear fuel generally predominantly comprises a zirconium alloy which has only a low neutron-absorbing capacity. The nuclear fuel is usually arranged in the cladding tube in the form of a column which is stacked up from cylindrical sintered shaped bodies (pellets, nuclear fuel sintered bodies, sintered bodies). The cladding tube should in this case on the outer side have, inter alia, the best corrosion properties possible, i.e. a high corrosion resistance, with respect to the coolant. Moreover, it should be safely and reliably able to securely enclose the nuclear fuel and also nuclear fission products formed during the nuclear reaction, such as for example fission gases, at least throughout the entire dwell time of a fuel assembly, in order to reliably avoid contamination of the coolant. Suitable materials for this purpose are zirconium alloys, in particular Zircaloy alloys and zirconium alloys in combination with further materials (e.g. as a coating). However, different conditions, for example varying temperature and pressure conditions, and transient fluctuations in these parameters may occur in pressurized water reactors and boiling water reactors, in each case imposing different demands on cladding tubes and also on the fuel used in these reactors. Accordingly, various materials are customarily employed in boiling water reactors and pressurized water reactors.

Since the cladding tube generally tightly surrounds the nuclear fuel sintered body, it should be able to absorb on the inner side in particular changes in shape of the nuclear fuel sintered bodies during operation of the reactor. Since the outer side and the inner side of a cladding tube are therefore supposed to satisfy different demands, two-layer cladding tubes have by now become customary. In particular, cladding tubes are designed to be as ductile as possible on their inner side, in order, inter alia, to be able to absorb the changes in shape of the nuclear fuel sintered bodies and the resulting fuel/cladding tube interactions (Pellet Cladding Interaction—PCI). For this purpose, the cladding tube should be sufficiently capable of expansion and should be able to absorb high pressures which in some cases occur over a small area and in some cases for a very short time and variably and/or statically. This is the case in particular if, for example, fragments of a nuclear fuel sintered body become jammed in the cladding tube.

In principle, all substances which contain types of fissionable heavy metal, in particular heavy metal oxide, can be used as nuclear fuels. These substances comprise in particular nuclear fuels which are customary for light water reactors, containing uranium and/or plutonium and/or thorium and being in the form of powders and/or sintered bodies. To produce a nuclear fuel sintered body, first of all it is customary to obtain a nuclear fuel powder by way of a conversion process.

In principle, the state of the art conversion processes can be differentiated on the basis of the process used for producing $UO_2$ from $UF_6$. These are on the one hand dry-chemical conversion processes and on the other hand wet-chemical conversion processes. In the wet-chemical processes, a $UO_2$ powder is obtained indirectly from uranium hexafluoride ($UF_6$) after precipitation and separation of an intermediate stage from a solution. Known processes are named according to their intermediate stages, for example the AUC (ammonium uranyl carbonate) process and the ADU (ammonium diuranate) process. The wet-chemical conversion processes produce particularly high levels of radioactive waste, which entails considerable ecological and economic drawbacks compared to the dry-chemical processes.

In dry-chemical conversion processes (dry conversion, DC), uranium hexafluoride ($UF_6$) is generally reacted with water and hydrogen to form uranium dioxide directly, generally according to the following overall equation:

$$UF_6 + 2H_2O + H_2 \rightarrow UO_2 + 6HF.$$

The $UO_2$-containing powder (DC powder) which is formed can be used as the main raw material for production of a standard nuclear fuel powder and/or a mixed-oxide nuclear fuel powder (MOX nuclear fuel powder). To produce an MOX nuclear fuel powder it is possible, for example, to mix a $UO_2$-containing powder with further powders which contain fissile heavy metal oxides, for example $U_2O_3$, $PuO_2$ or $ThO_2$ or compounds thereof, to form an MOX nuclear fuel powder.

After its production, the nuclear fuel powder is treated further. Additives are in some cases added to a nuclear fuel powder, inter alia to influence the properties of a nuclear fuel sintered body and/or for reasons which are of relevance to the production process.

This powder is usually pressed into shaped compacts, and the shaped compacts are sintered to form nuclear fuel sintered bodies. During sintering, the crystallites of the starting powder agglomerate to form grains in the sintered body. The size of the grains of a nuclear fuel sintered body can be influenced by a multiplicity of parameters during the production process and/or in the starting powder. The grain size has a decisive influence inter alia on the mechanical properties, in particular the plasticity of the sintered body and/or on its properties with regard to fission gas retention.

It has become known from U.S. Pat. No. 4,869,866 that a sintered body which has both good fission gas retention and improved PCI properties is of interest. However, for this purpose it is provided for virtually all the grains of a nuclear fuel sintered body to be completely surrounded by a glassy aluminosilicate phase. According to U.S. Pat. Nos. 4,869,867 and 4,869,868, it is also possible to provide a completely surrounding glassy magnesium silicate phase or a completely surrounding magnesium aluminosilicate phase.

According to Japanese JP 01029796, to improve the fission gas retention and the PCI properties, it is advantageous for $Cr_2O_3$ to be added to a nuclear fuel powder in an amount of 1000–3000 ppm, in order to accelerate grain growth during the sintering process.

Further publications are restricted either purely to measures for simply promoting grain growth or purely to measures for simply reducing the PCI.

Japanese JP 55151292 provides for an additive composition to be added solely for the purpose of increasing the grain size. In addition to a wide range of further additives, one example also mentions $Fe_2O_3$, in an amount of 50 ppm.

According to Japanese JP 55087993, a range of oxides are to be added, in high levels of 2000–50,000 ppm as additives to a nuclear fuel powder in order to produce a large number of oxygen defects, which serve as fission gas traps.

According to Japanese JP 55104791, a two-shell nuclear fuel sintered body is provided, having a multiplicity of additives in high levels of up to 50,000 ppm, in order, by means of the outer shell, to improve only the PCI properties of the nuclear fuel sintered body, while the inner shell is intended to improve the mechanical hardness of the nuclear fuel sintered body.

In normal operation, and particularly also in the event of ramp changes of power in the nuclear reactor, nuclear fuels for light water reactors release fission gases. The rate of release is dependent, inter alia, on the grain size of the nuclear fuel sintered body. Furthermore, the nuclear fuel sintered body, while it is being used in the nuclear reactor, is subject to dimensional fluctuations which, particularly in the event of an increase in dimensions, lead to interaction between the nuclear fuel sintered body and the cladding tube (PCI properties). This interaction is likewise dependent, inter alia, on the grain size of the nuclear fuel sintered body.

International PCT publication WO 00/00985 describes a nuclear fuel pellet wherein, through the addition of an Nb-containing dopant, a particularly favorable grain growth and a particularly favorable creep behavior are to be established.

SUMMARY OF THE INVENTION

It is accordingly an object of the invention to provide an improved method of producing a nuclear fuel sintered body from a powder which contains a fissile heavy metal oxide powder, which overcomes the above-mentioned disadvantages of the heretofore-known devices and methods of this general type and which results in a nuclear fuel that has properties which are improved both with regard to the release of fission gases and with regard to the nuclear fuel sintered body/cladding tube interaction (PCI properties). In particular, the properties of a nuclear fuel powder derived from a dry-chemical conversion process are to be taken into account both with a view to improved fission gas retention and with a view to improved PCI properties.

With the foregoing and other objects in view there is provided, in accordance with the invention, a method of producing a nuclear fuel sintered body, which comprises:

producing a powder containing a fissile heavy metal oxide, the powder comprising a sinter-active heavy metal oxide powder obtained predominantly from a dry-chemical conversion process;

adding a dopant to the powder for increasing a grain size and a plasticity of a resulting sintered body, the dopant containing an iron compound and being added such that a proportion by weight of the iron compound in relation to a proportion by weight of the heavy metal oxide in the nuclear fuel sintered body is at least 100 ppm; and sintering the powder to form the nuclear fuel sintered body.

In other words, the objects of the invention are achieved by a method of producing a nuclear fuel sintered body, wherein a powder, which contains a fissile heavy metal oxide, is produced, treated further and sintered, the powder comprising a sinter-active heavy metal oxide powder which is obtained predominantly from a dry-chemical conversion process, and a dopant which increases both the grain size and the plasticity of the sintered body and contains at least 100 ppm of an iron compound, in particular of an iron oxide compound, is added to the powder.

The quantitative indication 100 ppm, as used herein, indicates the proportion by weight of the iron compound, in particular of the iron oxide compound, in relation to the total proportion by weight of the heavy metal oxide in the finished nuclear fuel sintered body (i.e. in $\mu g/g$, which corresponds to ppm by weight). The iron compound may, if appropriate, also be iron.

The method according to the invention has in particular the advantage, firstly, that it can be carried out as part of existing production methods and sequences used in dry conversion. An iron compound, in particular an iron oxide compound, can easily (for example by direct addition) be added to the nuclear fuel powder, for example before or after a granulation operation or during milling. On account of the ferromagnetic characteristic of the iron particles, it is also easy to locate a nuclear fuel sintered body in a cladding tube, which has advantages for the production process and during process monitoring, in particular for the manufacture of fuel assemblies.

The invention is based on the surprising discovery that targeted addition of the iron-containing dopant, compared to a conventional fuel, both increases the grain size and increases the plasticity. Therefore, these two inherently contradictory parameters can be set particularly favorably, so that the sintered body has a particularly favorable operating performance both with regard to the release of fission gases and in terms of its PCI properties. Complex or additional measures, such as for example completely surrounding grains with a silicate phase of an additive, are rendered superfluous inter alia if the grain according to the invention already has a specifically favorable size.

Tests and experiments in connection with this invention carried out on a very wide range of nuclear fuel sintered bodies used in reactors have clearly demonstrated that the rate at which fission gases are released in sintered bodies with a coarse grain, i.e. a large grain size, is lower, i.e. the rate of release decreases as the grain size of the sintered body increases. This is because, on the one hand, when using a coarse grain the fission gases to a large extent remain in the grain and, on the other hand, when using a coarse grain the diffusion of fission gases at the grain boundaries is greatly reduced. By contrast, further tests and experiments carried out in connection with this invention have established that in sintered bodies with a fine grain, i.e. a small grain size, the interaction of the sintered body with the cladding tube is lower, i.e. in particular the cladding tube has a lower expansion despite a change in dimension of the sintered body. This is because fine-grained sintered bodies have a higher plasticity than coarse-grained sintered bodies, which manifests itself in an improved creep capacity in fine-grained sintered bodies. As a result, loads and, if appropriate, expansion of a cladding tube can be reduced considerably in particular on account of an increase in the dimensions of the sintered body.

There is in particular a discrepancy between an aim to reduce the release of fission gases in a nuclear fuel sintered body and also of reducing a nuclear fuel sintered body/cladding tube interaction. According to the inventive discovery, however, this discrepancy is overcome by targeted doping with an iron compound, which allows favorable setting of the grain size and, in addition, favorable setting of further characteristic parameters, in particular of the plasticity.

The doping of the nuclear fuel with a dopant which contains at least 100 ppm of an iron compound, in particular of an iron oxide compound, (and if appropriate, according to a refinement of the invention, with a dopant which additionally contains compounds of silicon, aluminum or chromium) moderately and deliberately increases the grain size in accordance with the inventive discovery. It is set in precisely such a way that, on the one hand, the release of fission gases is reduced and, on the other hand, the plasticity is increased compared to conventional fuels of the same or smaller grain size.

According to the invention, this measure has the combined effect of both a reduced release of fission gases and of a lower pellet/cladding interaction. The controlled doping of the fuel with at least 100 ppm of an iron compound, in particular with an iron oxide compound, and in particular, if appropriate, additionally with a silicon and/or aluminum and/or chromium compound, makes it possible to produce a nuclear fuel sintered body with properties which hitherto appeared impossible, namely both a coarse grain size and an improved plasticity.

According to the inventive discovery, it is advantageously provided for the addition of dopant to be carried out taking account of the properties of a powder which, specifically, is obtained predominantly in a dry-chemical or other direct conversion process.

This is because in the case of powders obtained from wet-chemical processes, the size of the crystallites which fuse together to form grains during sintering, at considerably less than 100 nm, is well below the crystallite size of powders obtained from dry-chemical processes (250 nm±100 nm). For this reason, among others, the wet-chemical powders sinter at an earlier time during the sintering process and starting from a low sintered density. By contrast, the sintering behavior of powders obtained from dry-chemical processes is slower and starts from a greater sintered density. By way of example, powder obtained from the ADU process has a BET surface area of at least 4 $m^2/g$, whereas a powder obtained from a dry-chemical process has a surface area of, for example, 0.5–4 $m^2/g$, generally around 2 $m^2/g$ (BET surface area: a specific surface area measured using the BET method).

If the starting point used were to be a powder obtained from a wet-chemical conversion process (e.g. ADU powder), a dopant would dissolve more successfully in the small crystallites of the ADU powder than in a crystallite of a powder obtained from a dry-chemical conversion process, and consequently the grain of the ADU powder would grow more quickly, and therefore the sintered body would become too hard on account of an excessively large grain. Therefore, identical quantities of dopant have completely different effects on a powder obtained from a wet-chemical process and a powder obtained from a dry-chemical process.

Specifically, in a DC powder, a dopant advantageously overall dissolves less well in the crystallite of the starting powder and the grain formed therefrom during the sintering process, since the crystallites are larger from the outset and sinter more slowly than in the case of a powder derived from a wet-chemical process, e.g. an ADU powder. This property of the DC powder, which initially appears to be a disadvantage, is, however, advantageously exploited according to the inventive discovery. This has considerable advantages both for a process and for a sintered body according to the invention. This is because, when a DC powder is being sintered in accordance with the invention, firstly the grain growth is not excessive but is sufficient to ensure adequate plasticity in combination with good fission gas retention, i.e. leads to a moderately sized grain. Secondly, some of the dopant remains outside the grain and increases the grain boundary slip with a moderately sized grain and therefore the plasticity with a moderately sized grain. The dopant is therefore added in particular in a quantity which results in a moderately large-grained microstructure and a high plasticity of the nuclear fuel sintered body.

Particularly with increasing reactor use, a nuclear fuel sintered body undergoes an increase in volume and accordingly an increase in diameter, which can lead to a considerable load and possibly expansion of the cladding tube. The importance of this phenomenon increases as the operating time of a fuel assembly having a nuclear fuel sintered body of this type increases, for example three or more use cycles. This is the case with fuels with a burn-up potential of 30 MWd/kgSM to 80 MWd/kgSM or more (high burn-up). Iron compounds, and in particular iron oxide compounds, as dopant have the advantage over other dopants of allowing plasticity of a nuclear fuel sintered body according to the invention even for long dwell times of a fuel assembly. This therefore has the advantage, with regard to the nuclear fuel sintered body produced using said process, that it substantially retains its plasticity even after three or more use cycles of a fuel assembly and also still has a sufficient fission gas retention.

Especially an iron compound, and in particular an iron oxide compound, compared to standard dopants with a moderate grain size, also does not accelerate diffusion to such an extent with respect to fission gas retention. Increasing the grain size by adding dopant usually also entails lower fission gas retention, on account of an interfacial diffusion for fission gases which is also improved by the dopant. However, this drawback of other dopants is not present when using an iron compound, and in particular an iron oxide compound, as dopant, as has surprisingly emerged.

In particular, an iron oxide compound can advantageously be successfully dissolved in the fluorite lattice of the heavy metal oxide and in the process releases oxygen. This is decisively responsible for the grain growth, since it greatly increases the mobility of the heavy metal atoms.

On the other hand, in particular iron oxide, compared to other dopants, on account of its high valency retains the oxygen for a sufficient time during sintering ($Fe_2O_3$, FeO, FeOH), and therefore promotes grain growth more successfully than other dopants for a nuclear fuel powder obtained from a dry-chemical conversion process (DC powder). Standard dopants are reduced to metals too quickly for the somewhat slower grain growth or sintering process described above for a DC powder (for example compared to an ADU powder). Nevertheless, iron oxide as dopant advantageously increases the grain size only up to a moderate size of 10 $\mu$m to 25 $\mu$m or even 30 $\mu$m, so that both the build-up of large, i.e. also sharp-edged, grains is suppressed, and therefore sufficient plasticity of the nuclear fuel sintered body is also ensured. This is extremely advantageous for the PCI properties of the nuclear fuel sintered body. Grain sizes of 30 μm to 80 μm which can in some cases be reached with other dopants, such as Ti, Nb and Cr, are less advantageous for the PCI properties.

According to an advantageous refinement of the invention, the dopant therefore contains an iron oxide compound, in particular one such compound selected from the group consisting of: FeO, $Fe_2O_3$, $Fe_3O_4$, $Fe(OH)_2$ and Fe(OH). Overall, iron oxide as dopant therefore has a good compatibility with the properties of a DC fuel powder, in particular even in production processes with regard to the mixing performance and the sintering performance.

In accordance with an added feature of the invention, the fissile heavy metal oxide advantageously contains an oxide of a heavy metal selected from the group consisting of: uranium, plutonium and thorium and/or a compound of the heavy metal, in particular $UO_2$ and/or $PuO_2$ and/or $ThO_2$. This applies in particular also to the production of MOX fuels.

If appropriate, the powder may expediently also contain an element selected from the group consisting of beryllium and molybdenum, and/or a compound of these elements. This advantageously increases the thermal conductivity of the nuclear fuel sintered body.

The powder preferably contains a $U_3O_8$ powder which is obtained by oxidation of a $UO_2$ powder obtained from a dry-chemical or other direct conversion process. However, if appropriate it is also possible for the powder to contain a $U_3O_8$ powder which is obtained by oxidation of an $UO_2$ powder obtained from a wet-chemical process, in particular an AUC or ADU process.

The powder expediently includes finely dispersed particles of a size of substantially 1–1000 μm, in particular of a size of on average 50 μm to 150 μm. In particular, a powder of this type also includes crystallites of a size of substantially 50–500 nm, in particular of a size of on average 100 nm to 350 nm. These are particularly advantageous properties for a powder produced using a dry-chemical or other direct conversion process, which according to the inventive discovery have advantageous effects in particular on the grain size which is established during the sintering process.

The powder is advantageously homogenized and/or milled for further treatment. In particular, the powder is pre-compacted and/or granulated for further treatment, expediently down to a particle size substantially of less than 2 mm. This improves the free-flowing properties of the powder, i.e. facilitates the process sequence, in particular the introduction of the powder into press molds for compression of the powder (prior to the sintering operation). In addition to an iron compound, the dopant expediently also contains a chromium compound selected from the group consisting of $Cr_2O_3$ and $CrO_3$.

Furthermore, it is expedient for the dopant to contain a silicon and/or silicate compound, in particular a compound selected from the group consisting of silicon oxide, iron silicate and magnesium silicate. It is preferable for the dopant also to contain a compound of an element selected from the group consisting of magnesium, niobium, titanium, aluminum, vanadium and platinum, in particular an oxide of the element. This allows the abovementioned advantages of the invention in combination with an iron compound, in particular an iron oxide compound, to be improved further. This applies in particular to a silicon or aluminum compound, expediently not in excessively large quantities.

It is preferable for the dopant to be added in a quantity which leads to a microstructure of the nuclear fuel sintered body which has a grain dimension substantially of more than 8 μm, in particular a grain dimension in the range from approximately 10–25 μm. A grain size of 10–15 μm is particularly preferred.

Furthermore, the dopant is expediently added in an amount which leads to a favorable plasticity of the nuclear fuel sintered body, which plasticity is determined by a moderate creep of the sintered body at temperatures of between 1100° C. and 1700° C. and pressures of approximately 70–160 N/mm², in particular at temperatures of around approximately 1200° C. and at pressures of approximately 70–90 N/mm².

In particular, this quantity exceeds a quantity of the dopant which is soluble in the lattice of the heavy metal oxide. It has proven particularly expedient for the dopant to be added in an amount of between 100 ppm and 5000–6000 ppm, preferably in an amount of between 500 ppm and 3000 ppm. Amounts of between 750 ppm and 2500 ppm have proven particularly favorable. A quantity of this nature is not so high that a grain would be completely surrounded by the added additive (for example in the case of silicates).

It is advantageous for the dopant to be added to the powder in a step involved in the production and/or further treatment thereof, preferably prior to a granulation step. If appropriate, it is also expedient for the dopant to be added during and/or after a granulation step. For this purpose, the dopant is expediently added in powder form, the dopant powder having a particle size substantially of less than 5 μm, preferably a particle size substantially of less than 2 μm.

According to a refinement of the invention, a further dopant, which contains at least one compound of a substance selected from the group consisting of zirconium, cerium, yttrium, lanthanum, ytterbium, cesium, calcium, all further subgroup elements, lanthanide elements and actinide elements, is added to the powder. This dopant is in particular an oxide of the substance.

It is expedient for a neutron poison, in particular a gadolinium compound and/or a boron compound and/or an erbium compound, to be added to the powder. This has proven favorable in particular with a view to achieving a high burn-up in a fuel assembly. For this purpose, there is advantageously a higher level of the heavy metal oxide powder. This level may expediently exceed 3.5% or 4%, or may even be 4.5–5%. The level could even exceed 5%, for example could be 6.5%. To improve processing of the powder, it has proven favorable to add a lubricant, in particular a substance selected from the group consisting of stearate compounds, stearic acid, amide compounds, glycol compounds, and paraffin compounds, to the powder.

To set the sintered density, and for reasons of fission gas retention, it has also proven advantageous to add a pore-forming agent, in particular a substance selected from the group consisting of ammonium salts, ammonium carbonates, acetate compounds, oxalate compounds and sugar starch, to the powder. It has proven particularly advantageous to add a pore-forming agent in such a manner that a pore size of approximately between 2–200 μm, in particular approximately between 5–80 μm, is established in the sintered body.

The dopant or a plurality of further additives, for example a further dopant, a neutron poison, a pore-forming agent or a lubricant, are expediently added together to the powder and/or the further-treated powder. This additionally simplifies The method according to the invention.

The powder is advantageously pressed into shaped bodies prior to sintering, these shaped bodies expediently having a density of approximately 4.5–7 g/cm³.

The powder (a shaped body) is advantageously sintered substantially at temperatures of between 1500° C. and 1900° C. and in an atmosphere with a pressure in the region of standard pressure for a duration of 2–8 hours.

In particular, the powder (a shaped body) is sintered to approximately 93–98.5% of the theoretical density. Accordingly, the sintered shaped bodies expediently have a density of 10–20 g/cm³ in particular a density of 10.0–10.8 g/cm³.

For this purpose, the powder (a shaped body) is expediently sintered under a reducing inert gas atmosphere. The inert gas atmosphere preferably predominantly contains inert gases, in particular He and/or Ar, if appropriate also advantageously at least one further gas selected from the group consisting of $H_2$, $N_2$ and $CO_2$. The ratio of $H_2$ to $N_2$ in the inert gas atmosphere is advantageously set to be substantially between 1:1 and 3:1. The ratio between the quantity of the further gases and the quantity of the inert gases is expediently set to be between 0.02:1 and 0.08:1.

During sintering, it is expedient to set an oxygen partial pressure of the inert gas atmosphere in such a manner that $U_3O_8$ fractions of the powder are reduced to form $UO_2$ fractions of the powder. In particular, however, an oxygen partial pressure of the inert gas atmosphere is also set in such a manner that reduction of the iron oxide fractions of the powder to form iron fractions of the powder is avoided.

For this purpose, it is particularly expedient to set the partial pressure range approximately to a standard pressure lowered by 5% up to a standard pressure increased by 5%. The oxygen partial pressure of the inert gas atmosphere is preferably set at between $10^{-20}$ and $10^{-6}$ atm.

In a very particularly advantageous configuration of the invention with regard to the process, the object is accordingly achieved by a method of producing a nuclear fuel sintered body, wherein a powder which contains at least one heavy metal oxide is produced, the powder containing a sinter-active $UO_2$ heavy metal oxide powder which is obtained predominantly in a dry-chemical or other direct conversion process, and in particular has particles of a size of 1–1000 μm with crystallites of a size of 50–500 nm, and contains a $U_3O_8$ heavy metal oxide powder, which is predominantly obtained by oxidation from some of the sinter-active $UO_2$ heavy metal oxide powder, and if appropriate contains a returned $U_3O_8$ heavy metal oxide powder, the powder being treated further, and a dopant, which increases both the grain size and the plasticity of the sintered body and contains at least 100 ppm of an iron compound, in particular of an iron oxide compound, being added to the powder, the powder is pressed into shaped bodies, and the shaped bodies are sintered at temperatures of between 1500° C. and 1900° C. and in an atmosphere with a pressure in the region of standard pressure for a duration of 2–8 h.

In particular, the nuclear fuel sintered body preferably contains an iron oxide compound, in particular one such compound selected from the group consisting of: FeO, $Fe_2O_3$, $Fe_3O_4$, $Fe(OH)_2$ and $Fe(OH)_3$.

To achieve the advantages according to the invention, the nuclear fuel sintered body particularly advantageously has a microstructure which is wherein by a grain dimension substantially of more than 8 μm, in particular up to 15 μm, i.e. a grain dimension in the range from approximately 10–25 μm. A grain size of 10–15 μm is particularly preferred.

According to a refinement of the invention, the nuclear fuel sintered body preferably also has a pore size of approximately between 2–200 μm, in particular of approximately between 5–80 μm. It preferably has a density, which is influenced inter alia by the pore size, of 10–20 g/cm³, in particular a density of 10.0–10.8 g/cm³.

A nuclear fuel sintered body according to the invention or a refinement of the invention accordingly likewise has a favorable plasticity, which is determined by a moderate creep, in particular at temperatures between 1100° C. and 1700° C. and pressures of approximately 70–160 N/mm², in particular at temperatures around approximately 1200° C. and at pressures of approximately 70–90 N/mm².

To prevent PCI as far as possible, the fuel should also be matched to the cladding tube according to the above design options.

Other features which are considered as characteristic for the invention are set forth in the appended claims.

Although the invention is illustrated and described herein as embodied in a method of producing a nuclear fuel sintered body, and nuclear fuel sintered body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
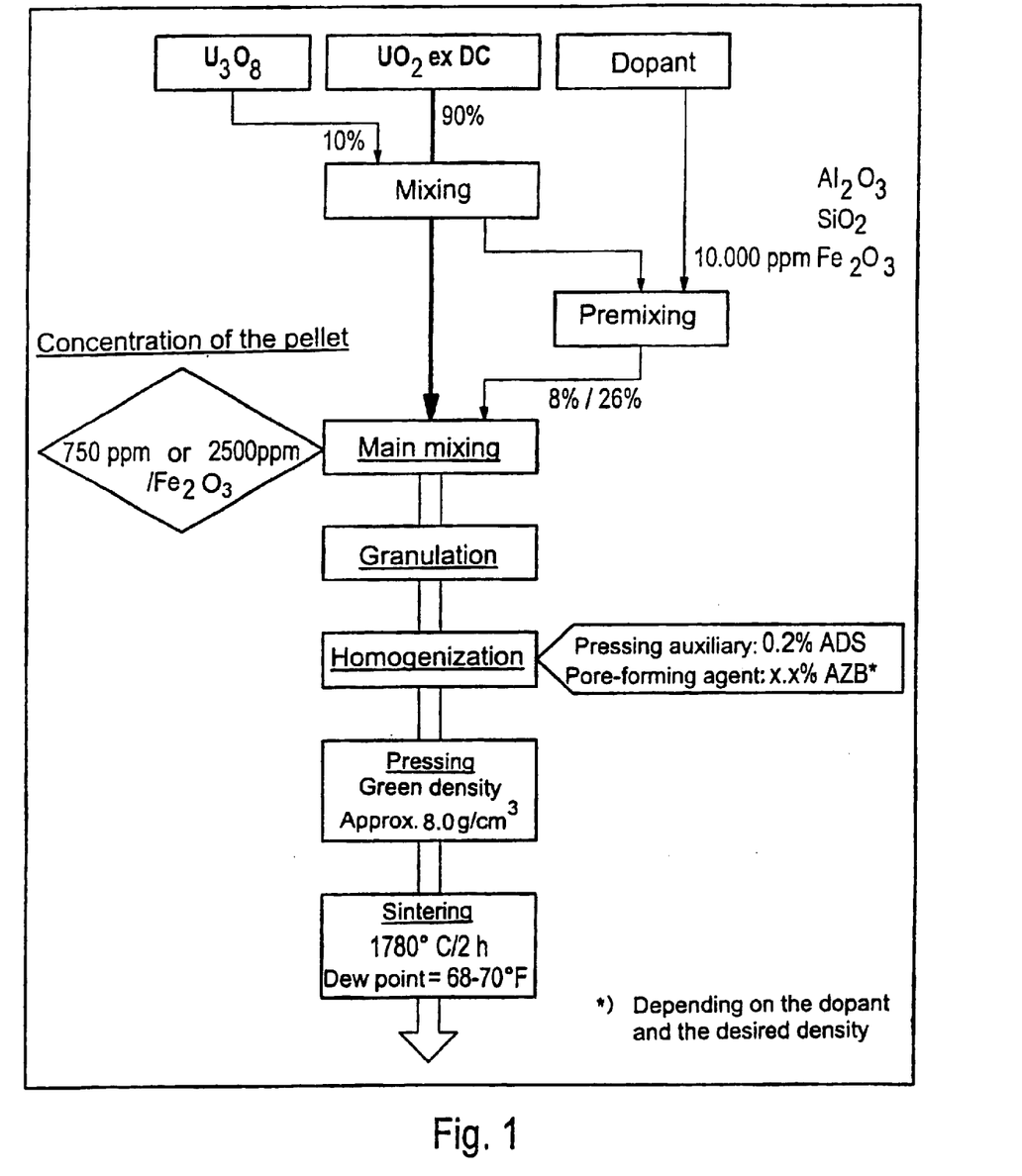
FIG. 1 is a flow diagram of a process sequence for a process according to the invention using an $UO_2$ powder obtained from a dry conversion (DC)

Referring now to the figures of the drawing in detail and first, particularly, to FIG. 1 thereof, there is shown a process sequence that is particularly advantageous and suitable for the production of a nuclear fuel sintered body with a burn-up potential of up to 80 MWd/kgSM or more. Naturally, the process shown can also be used as standard for the production of fuels with a lower burn-up potential which are currently and have previously been customary. This is an advantage which is based on the simple procedure that is adapted to previous processes. The starting powder comprises, in a first mixture, a proportion of approximately 90% of a sinter-active $UO_2$ powder derived from a dry-chemical conversion process and a proportion of approximately 10% of a $U_3O_8$ powder, which is obtained by oxidation of a powder obtained from a dry-chemical conversion process. The $U_3O_8$ powder may comprise reclaimed material, such as for example grinding slurry produced during the grinding of shaped bodies. The proportion of $U_3O_8$ powder may in this case be up to approximately 15%. Prior to the mixing process, the $UO_2$ powder is preferably subjected to homogenization, in order to increase the free-flowing properties and, for example, to eliminate agglomerates and cohesive powder fractions. For the production of MOX powders, which is optionally also possible but is not explained in further detail here, corresponding proportions of, for example, $PuO_2$ powder would also be added to the powder mixture.

A dopant which increases both the grain size and the plasticity of the sintered body is added to a part of this mixture of $UO_2$ powder and $U_3O_8$ powder. For this purpose, a dopant which contains approximately 10,000 ppm of $Fe_2O_3$, based on the part of the mixture (in ppm by weight), is added to the part of the mixture. In this exemplary embodiment, the dopant also contains further fractions, e.g. of $Al_2O_3$ or SiO. However, the fractions of $Al_2O_3$ or SiO may also be added in one of the subsequent process steps together or separately from one another in different process steps. They may preferably also be added as stearates or in some other form separately from one another. The dopant is mixed with the part of the mixture in a mixer. This takes place, for example, in a Turbula® mixer or alternatively a nauta mixer. If necessary, the part of the mixture is homogenized or milled beforehand or during the mixing. The latter arrangement is also referred to as a mastermix operation.

As indicated in the figure, part of the mixture may be approximately 8% of the total quantity of the mixture. In this case, this leads to a proportion of approximately 750 ppm of $Fe_2O_3$, based on the total quantity of the mixture. In a procedure which is likewise preferred, the part of the mixture amounts to 26% of the total quantity of the mixture. This then leads to a proportion of approximately 2500 ppm of $Fe_2O_3$, based on the total quantity of the mixture. In principle, the selection of the quantity of the part of the mixture sets the proportion of the $Fe_2O_3$ based on the total quantity of the mixture. In this way, it is possible to fix the quantity of dopant added with respect to the total quantity of the mixture variably between 100 ppm and an upper limit, e.g. 6000 ppm.

The remaining mixture and the part of the mixture comprising the dopant are combined in a screening step. During this step, the total quantity is preferably screened in a hammer mill. The quantity of dopant based on the quantity of the powder mixture is substantially the same as the quantity of dopant based on the total quantity of material in the subsequent sintered body (in ppm by weight), i.e. scarcely any dopant is lost during the further procedure, in particular during the sintering operation.

The process of admixing the dopant which is carried out in accordance with FIG. 1 has the advantage that, in this way, particularly intensive mechanical mixing of the dopant and the powder mixture is achieved. This leads to a particularly homogeneous distribution of the dopant in the nuclear fuel sintered body, which is particularly beneficial with a view to achieving the advantages of the invention.

In further process steps, the powder mixture is granulated and then homogenized. The granulation is advantageously carried out by means of a roll compactor, with in particular the density values and granule dimensions indicated above being achieved.

$Al_2O_3$ or SiO may also be added before and/or after the granulation operation. The proportions of $Al_2O_3$ or SiO may be up to 500 ppm of the powder mixture. During homogenization, a lubricant and a pore-forming agent are added. Lubricants are in this case added in an amount of approximately 2000 ppm, while the amount of pore-forming agent is dependent on the desired final density of the sintered body. This is dependent not least also on the quantity of dopant used.

The powder mixture is then pressed into shaped bodies, which should have a density of approximately 6 g/cm$^3$. The sintering operation takes place for approximately 2 h at a temperature of 1780° C. and under a moist $H_2/N_2$ atmosphere, the dew point of which is approximately 68–70° F.

Depending on the amount of $Fe_2O_3$ selected as dopant within the quantitative ranges that have already been listed, it is possible, with a moderately large grain and sufficient plasticity of the sintered body, to establish a slightly differing microstructure of the sintered body. This could, for example, advantageously take place in order to adapt the nuclear fuel to a specific type of cladding tube. By way of example, it would be possible to take account of the properties of a two-layer double tube or a one-layer single tube. It would also be possible to take account of the properties of a Zircaloy-4 alloy for a pressurized water reactor or a Zircaloy-2 alloy for a boiling water reactor.

At concentrations of 750 ppm of $Fe_2O_3$, i.e. in particular of more than 100 ppm, the $Fe_2O_3$ is almost completely dissolved in the grain of the sintered body. At significantly higher concentrations, at least at concentrations of approximately 2500 ppm of $Fe_2O_3$ or other iron compounds, some of the $Fe_2O_3$ or of the other iron compounds is also precipitated at the grain boundaries, which, in addition to the plasticity of the sintered body which has already been effected solely by the moderate grain size, also contributes to a higher grain-boundary slipping capacity and therefore makes a further contribution to the plasticity. If there are very large quantities of dopant, in particular quantities of 4000 ppm of $Fe_2O_3$ or more, iron-containing coarse, insular or clustered precipitations, which in some cases also contain uranium, are formed. This can be seen from FIGS. 2 to 5, which show microsections of sintered bodies according to the invention taken at room temperature.

Figure 2:
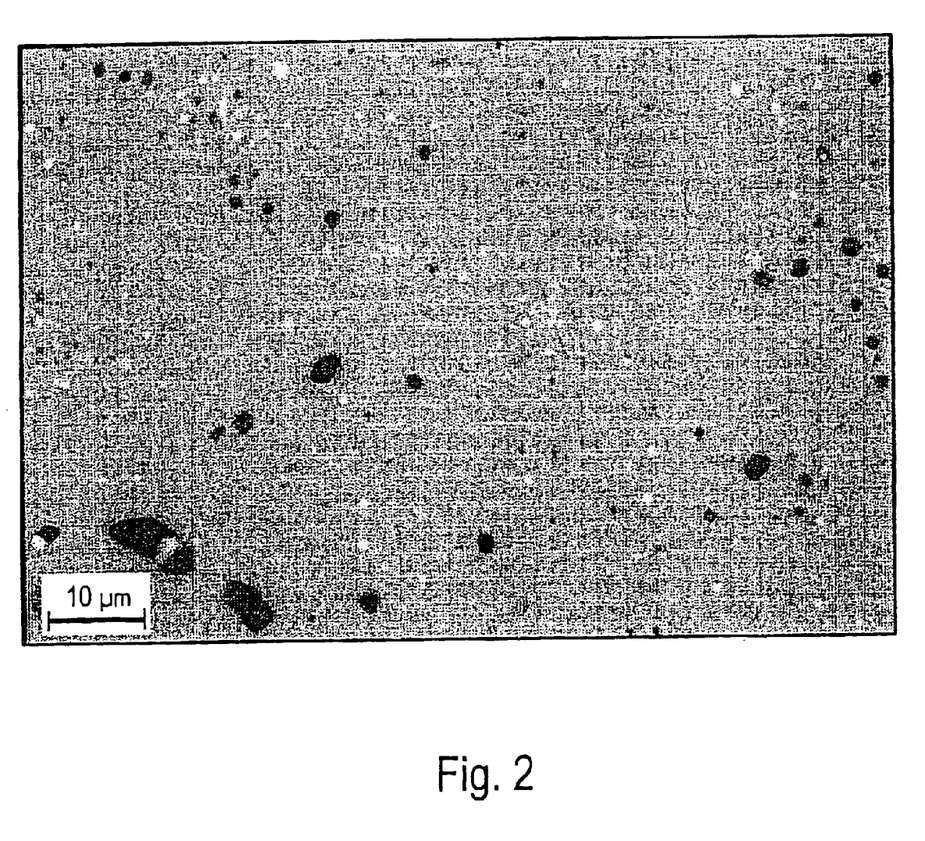
FIG. 2 is a micrograph of a first sintered body with its pore structure according to the invention, with a scale of 10 μm, produced using a $UO_2$ powder obtained from a dry conversion with 750 ppm of $Fe_2O_3$ as dopant.

FIG. 2 shows a first sintered body with its pore structure according to the invention, with a scale of 10 μm. The sintered body is produced using a $UO_2$ powder obtained from a dry conversion with 750 ppm of $Fe_2O_3$ as dopant. The dark areas of the microsection indicate pores, which have a mean size of approximately 5–10 μm. The light areas are iron precipitations which are only visible at room temperature and are dissolved at the temperatures which prevail during operation of the reactor.

Figure 3:
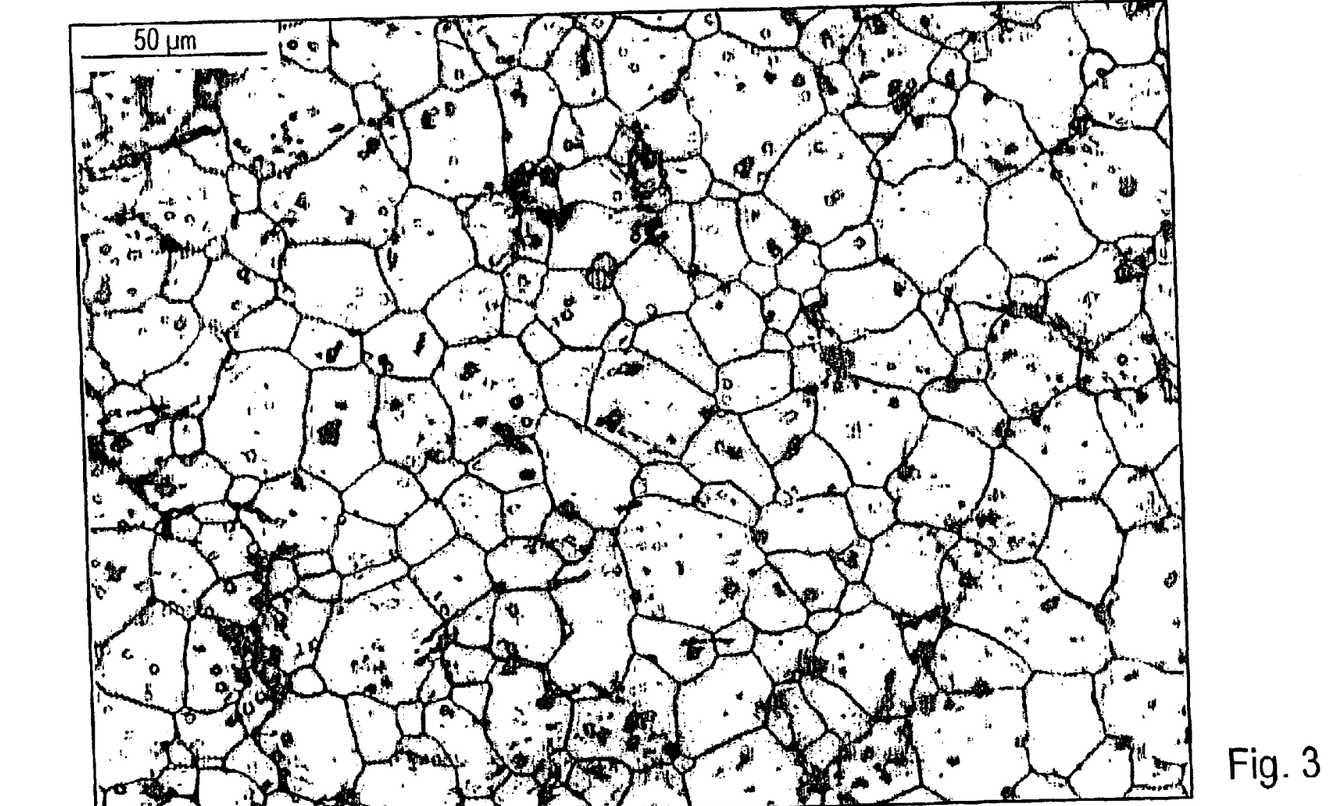
FIG. 3 is a micrograph of a second sintered body with its grain structure according to the invention, with a scale of 50 μm, produced using a $UO_2$ powder obtained from a dry conversion with 750 ppm of $Fe_2O_3$ as dopant.

FIG. 3 shows a second sintered body with its grain structure according to the invention, with a scale of 50 μm. The sintered body is produced using a $UO_2$ powder obtained from a dry conversion with 750 ppm of $Fe_2O_3$ as dopant. The figure reveals the microstructure, which has grain sizes of substantially between 10–25 µm.

Figure 4:
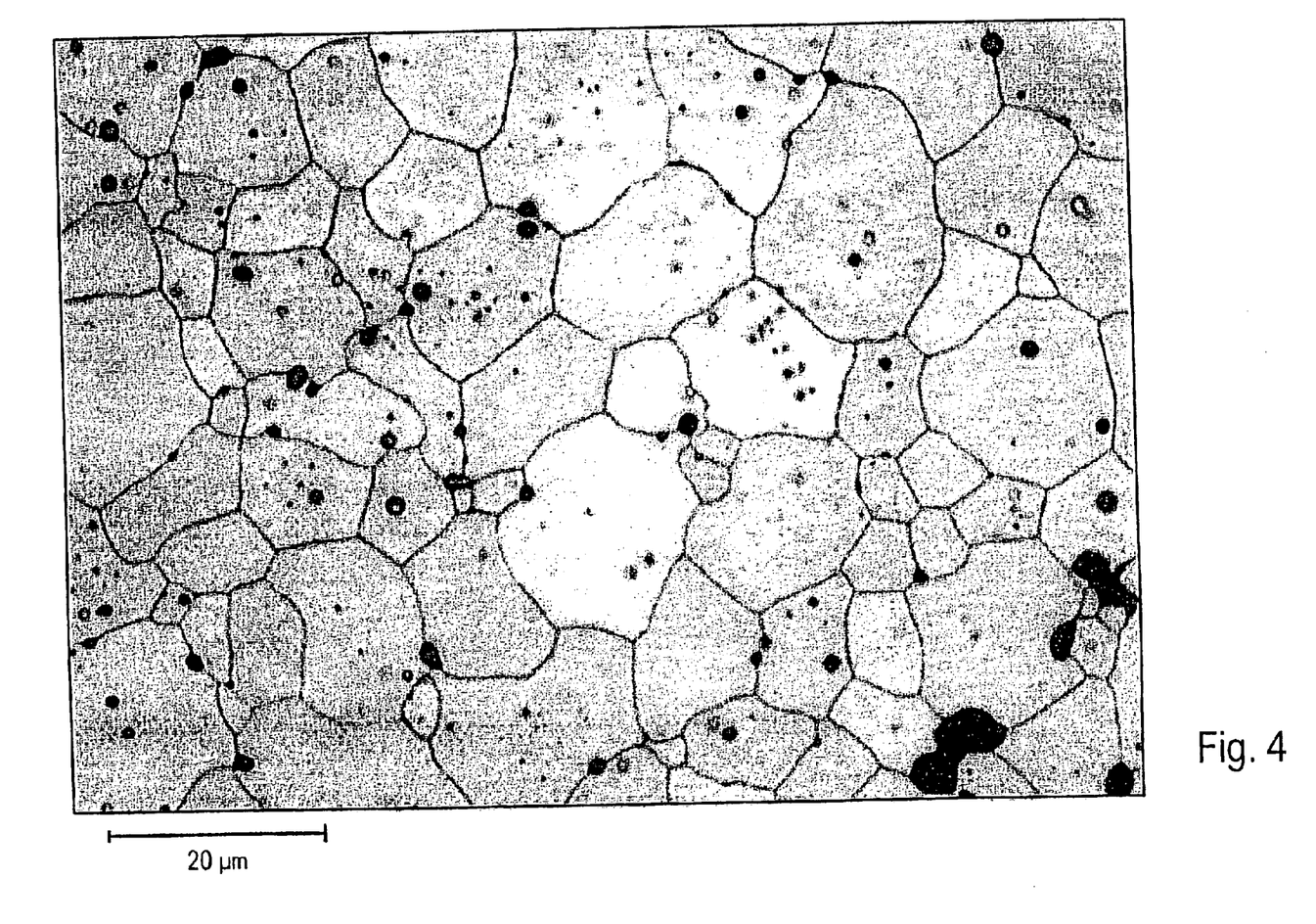
FIG. 4 is a micrograph of a third sintered body with its grain structure according to the invention, with a scale of 20 μm, produced using a $UO_2$ powder obtained from a dry conversion with 750 ppm of $Fe_2O_3$ as dopant.

FIG. 4 shows a third sintered body with its grain structure according to the invention, with a scale of 20 µm. The sintered body is produced using a $UO_2$ powder obtained from a dry conversion with 750 ppm of $Fe_2O_3$ as dopant. The figure clearly shows the grain boundaries. The grain sizes are once again on average in the range from 10–25 µm. The figure also shows that it is also quite possible for individual grains to be smaller than 10 µm, while other individual grains may quite possibly be larger than 25 µm.

Figure 5:
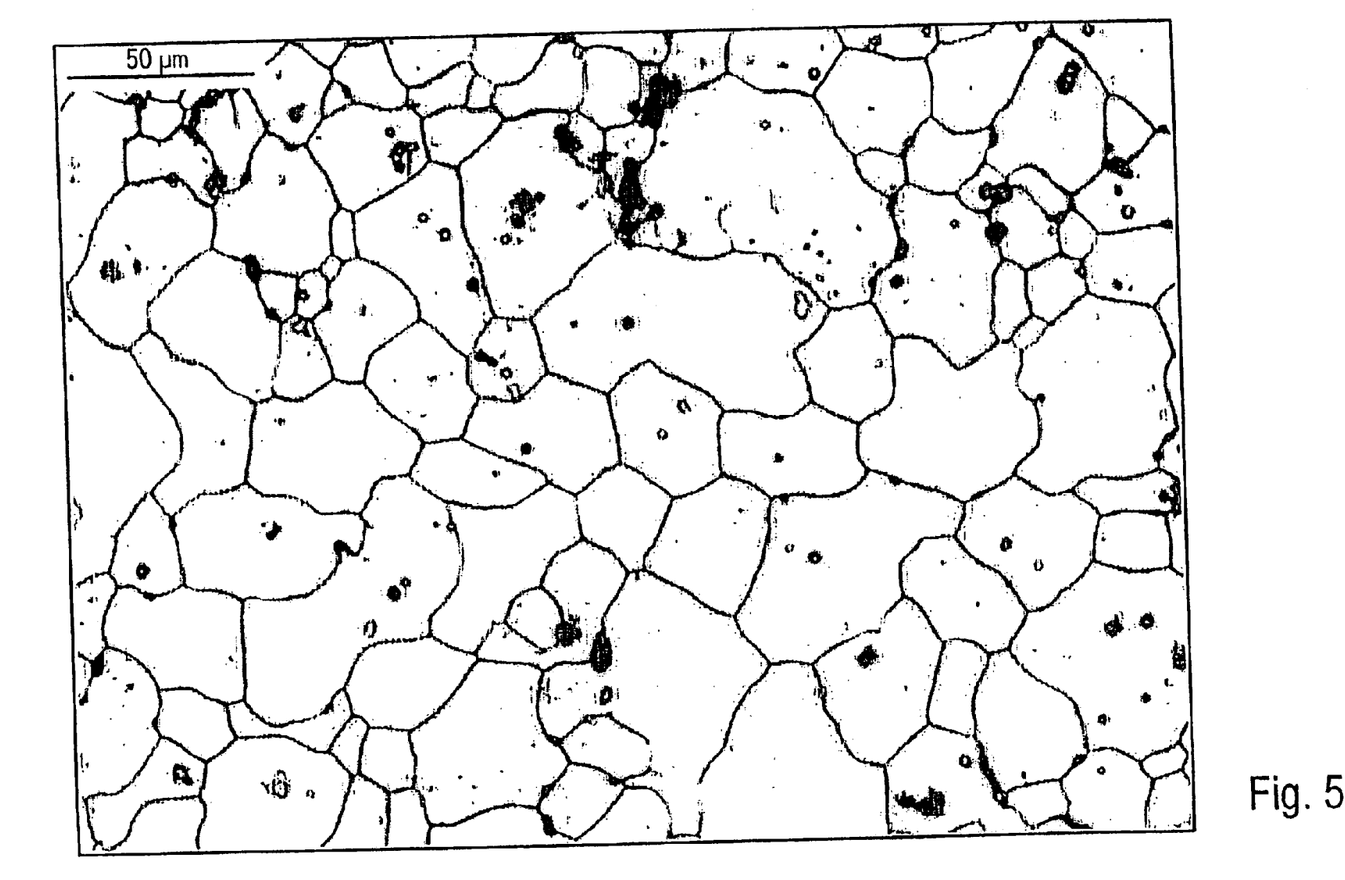
FIG. 5 is a micrograph of a fourth sintered body with its grain structure according to the invention, with a scale of 50 μm, produced using a $UO_2$ powder obtained from a dry conversion with 2500 ppm of $Fe_2O_3$ as dopant.
Figure 6:
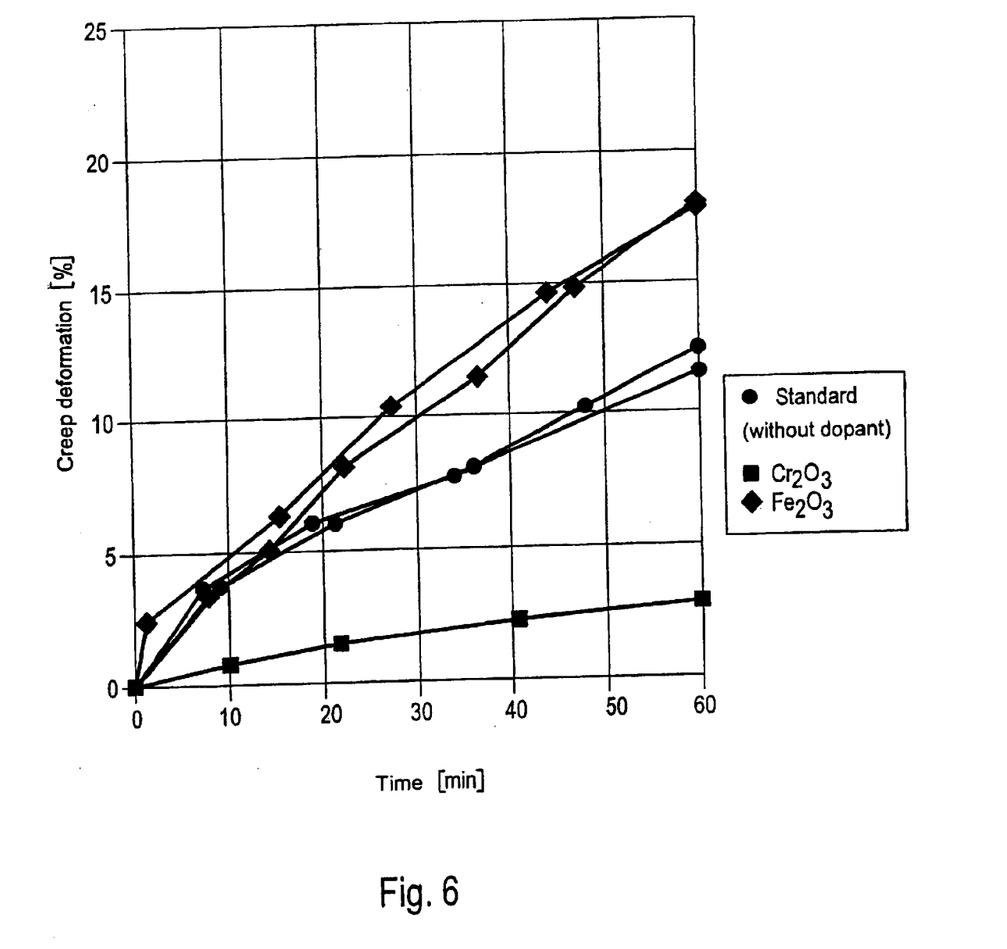
FIG. 6 is a graph showing the transient creep of sintered bodies according to the invention, produced using a $UO_2$ powder obtained from a dry conversion with 1500 ppm of $Fe_2O_3$ as dopant, at a temperature of 1400° C. and a pressure of 120 MPa, compared to the transient creep of other sintered bodies.
Figure 7:
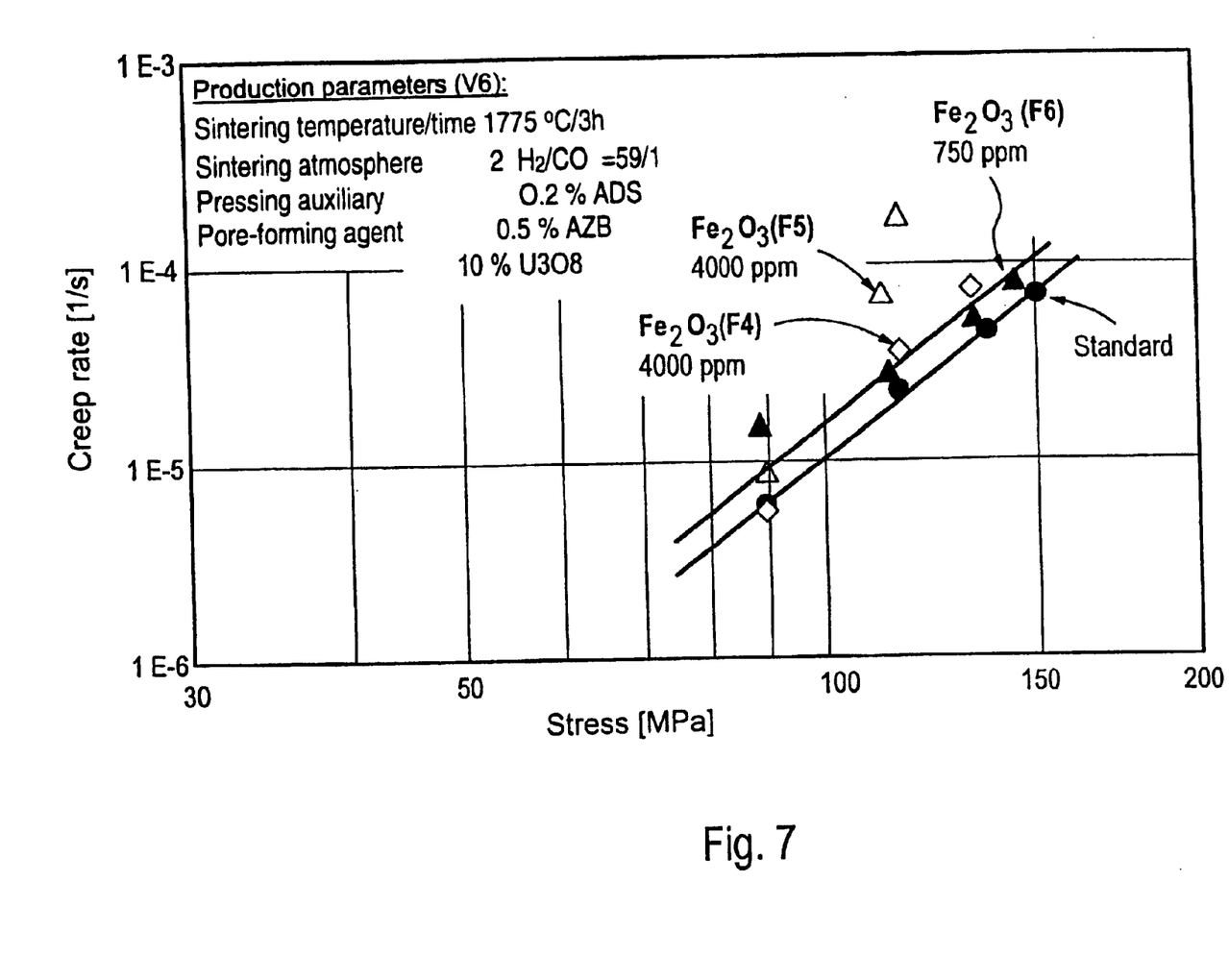
FIG. 7 is a chart of creep rates of sintered bodies according to the invention, produced using a $UO_2$ powder obtained from a dry conversion with 750 ppm–4000 ppm of $Fe_2O_3$ as dopant, at a temperature of 1400° C., compared to creep rates of other sintered bodies.
Figure 8:
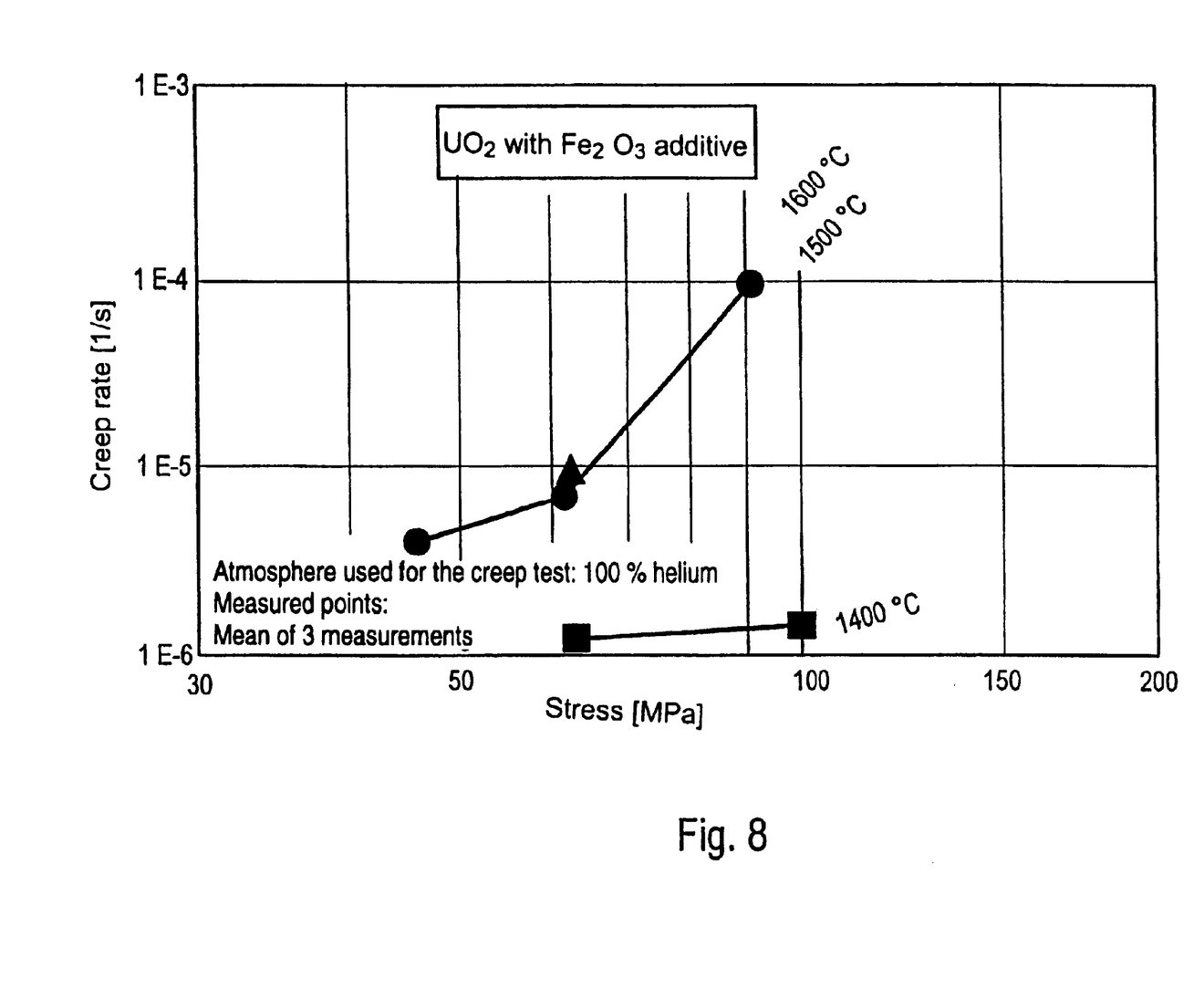
FIG. 8 is a chart of creep rates of sintered bodies according to the invention, produced using a $UO_2$ powder obtained from a dry conversion with 750 ppm of $Fe_2O_3$ as dopant, at temperatures of 1400° C., 1500° C. and 1600° C.

FIG. 5 shows a fourth sintered body with its grain structure according to the invention, with a scale of 50 µm. The sintered body is produced using a $UO_2$ powder obtained from a dry conversion with 2500 ppm of $Fe_2O_3$ as dopant. The grains are on average slightly larger than in a sintered body with an addition of dopant containing 750 ppm of $Fe_2O_3$. Since the $Fe_2O_3$ is no longer completely dissolved in the grain of the sintered body, some of the $Fe_2O_3$ is precipitated at the grain boundaries, which increases the grain boundary sliding. However, the quantity of dopant added is too low to allow the grains to be completely surrounded by the dopant. The extent of the plasticity of a sintered body is described primarily by its creep behavior. This is shown in FIGS. 6 to 8. In the present case, the origin of the creep process is substantially diffusion creep, more so than grain boundary sliding (as is the case when Si is added as additive), since the grains are already too large for grain boundary sliding. In the case of diffusion creep, the lattice defects migrate to the high-stress locations, where they are pressed out, while the atoms migrate to the low-stress or stress-free locations. An iron compound, and in particular an iron oxide, for its part, generates such defects in the crystallite—conversely Fe is incorporated in the fluorite lattice of the $UO_2$—i.e. increases the diffusion creep considerably—in some cases by a factor of up to or even more than 100.

FIG. 6 shows the transient creep of sintered bodies according to the invention compared to the transient creep of other sintered bodies. The sintered bodies according to the invention are produced using a $UO_2$ powder obtained from a dry conversion with 1500 ppm of $Fe_2O_3$ as dopant. The transient creep represents the temporal profile of the deformation of a cylindrical sintered body under the action of a stamping force acting on the base surface of the sintered body. The transient creep presented in FIG. 6 was recorded at a temperature of 1400° C. and a pressure of 120 MPa. The figure shows that an above sintered body according to the invention, compared to a previous standard and in particular compared to a sintered body doped with $Cr_2O_3$ in accordance with the prior art, has a higher capacity for creep and creeps more quickly. The latter factor is particularly important, since in the event of what are at times frequently variable power fluctuations when the reactor is operating, with steep ramps, correspondingly rapid plastic matching of the fuel is advantageous in order to improve the PCI properties. Matching to the transient expansion of a cladding tube can also be effected by means of the quantity of dopant and in particular the proportion of an iron compound, e.g. of $Fe_2O_3$.

Creep rates can be determined from a transient creep behavior as shown in FIG. 6, and these creep rates are shown in FIG. 7 and FIG. 8 for sintered bodies according to the invention.

FIG. 7 shows creep rates of sintered bodies according to the invention, produced using a $UO_2$ powder obtained from a dry conversion with 750 ppm–4000 ppm of $Fe_2O_3$ as dopant. Otherwise, the powder mixture of the sintered bodies contains 10% of $U_2O_3$. Moreover, 0.2% of ADS as lubricant and 0.5% of AZB as pore-forming agent were added to the powder mixture. The shaped bodies were sintered in an $H_2/CO_2$ atmosphere for 3 h at a temperature of 1775° C. The creep behavior of sintered bodies of this type was determined at a temperature of 1400° C. and compared to the creep behavior of other sintered bodies. This comparison showed that, even at relatively low compressive stresses, the plasticity of the sintered bodies according to the invention is considerably higher than that of conventional sintered bodies of the same or smaller grain size—taking account of the logarithmic plotting, the creep rate is increased by a factor or at least 2 to 3.

FIG. 8 shows creep rates for sintered bodies according to the invention, which have been produced using a $UO_2$ powder obtained from a dry conversion with 750 ppm of $Fe_2O_3$ as dopant. These sintered bodies were sintered in a 100% helium atmosphere. The figure shows the temperature dependency of the creep rates. In particular, the creep rates are shown at temperatures of 1400° C., 1500° C. and 1600° C. It is clear from this figure that an advantageously moderate creep behavior is achieved even at temperature conditions which prevail during operation of the reactor. There is sufficient creep at 1100° C., which is substantially attributable to deformation of the grain. At 1400° C., there is a particularly desirable moderate creep, which in particular is better than that achieved with an addition of Nb. At temperatures significantly above this, the plasticity of the sintered bodies increases. A linear behavior of the creep rate as the compressive stress increases should no longer be expected at very high temperatures. Nevertheless, the creep behavior is not excessive. If it were excessive, lack of adhesion would cause the grain boundaries to lose cohesion in the microstructure and disintegrate. This is the case, for example, if excessive silicon is added. Grain flow is undesirable, since this leads to the formation of sharp edges, which have an adverse effect on the PCI properties.

We claim:

1. A method of producing a nuclear fuel sintered body, which comprises:

producing a powder containing a fissile heavy metal oxide, the powder including a sinter-active heavy metal oxide powder obtained predominantly from a dry-chemical conversion process;

adding a dopant in powder form having a particle size substantially of less than 5 µm to the powder for increasing a grain size and a plasticity of the sintered body, the dopant containing an iron compound and being added such that a proportion by weight of the iron compound in relation to a proportion by weight of the heavy metal oxide in the nuclear fuel sintered body is at least 100 ppm; and sintering the powder substantially at temperatures of between 1500° C. and 1900° C. and in an atmosphere having a pressure substantially at standard pressure for a duration of between 2 and 8 hours to form the nuclear fuel sintered body.

2. The method according to claim 1, wherein the fissile heavy metal oxide contains a material selected from the group consisting of an oxide of a heavy metal selected from the group consisting of uranium, plutonium, and thorium and a compound of a heavy metal selected from the group.

3. The method according to claim 1, wherein the fissile heavy metal oxide contains at least one oxide selected from the group consisting of $UO_2$, $PuO_2$, and $ThO_2$.

4. The method according to claim 1, which comprises producing the powder to contain a $U_3O_8$ powder obtained by oxidation of a $UO_2$ powder obtained from a direct conversion process.

5. The method according to claim 1, which comprises producing the powder with finely dispersed particles of a size of substantially 1–1000 μm.

6. The method according to claim 1, which comprises producing the powder with finely dispersed particles of a size of substantially on average 50 μm to 150 μm.

7. The method according to claim 1, which comprises producing the powder with crystallites of a size of substantially 50–500 nm.

8. The method according to claim 1, which comprises producing the powder with crystallites of a size of substantially on average 150 nm to 350 nm.

9. The method according to claim 1, which comprises further treating the powder with at least one processing step selected from the group consisting of homogenizing and milling.

10. The method according to claim 1, which comprises further treating the powder with at least one processing step selected from the group consisting of pre-compacting and granulating.

11. The method according to claim 1, which comprises pressing the powder to form shaped compacts prior to the sintering step.

12. The method according to claim 1, wherein the dopant contains an iron oxide compound.

13. The method according to claim 1, wherein the dopant contains at least one iron oxide compound selected from the group consisting of FeO, $Fe_2O_3$, $Fe_3O_4$, $Fe(OH)_2$, and $Fe(OH)_3$.

14. The method according to claim 1, wherein the dopant contains a chromium compound selected from the group consisting of $Cr_2O_3$ and $CrO_3$.

15. The method according to claim 1, wherein the dopant contains at least one compound selected from the group consisting of silicon compound and silicate compound.

16. The method according to claim 1, wherein the dopant contains a compound selected from the group consisting of silicon oxide, iron silicate, and magnesium silicate.

17. The method according to claim 1, wherein the dopant contains a compound of an element selected from the group consisting of magnesium, niobium, titanium, aluminum, vanadium, platinum, and oxides thereof.

18. The method according to claim 1, which comprises adding the dopant in a quantity leading to a microstructure of the nuclear fuel sintered body with a grain dimension substantially of more than 8 μm.

19. The method according to claim 1, which comprises adding the dopant in a quantity leading to a microstructure of the nuclear fuel sintered body with a grain dimension in a range from substantially 10 μm to substantially 25 μm.

20. The method according to claim 1, which comprises adding the dopant in a quantity resulting in a given plasticity of the nuclear fuel sintered body, the given plasticity being characterized by a moderate creep of the sintered body at temperatures of between 1100° C. and 1700° C. and pressures of substantially 70–160 N/mm².

21. The method according to claim 1, which comprises adding the dopant in a quantity resulting in a given plasticity of the nuclear fuel sintered body, the given plasticity being characterized by a moderate creep of the sintered body at a temperature substantially around 1200° C. and at pressures of substantially 70–90 N/mm².

22. The method according to claim 1, which comprises adding the dopant in an amount exceeding an amount of the dopant that is soluble in a lattice of the heavy metal oxide.

23. The method according to claim 1, which comprises adding the dopant in an amount of between 100 ppm and 6000 ppm.

24. The method according to claim 1, which comprises adding the dopant in an amount of between 550 ppm and 3000 ppm.

25. The method according to claim 1, which comprises adding the dopant in an amount of between 750 ppm and 2000 ppm.

26. The method according to claim 1, which comprises adding the dopant to the powder in a step involved in a production and/or a further treatment of the powder.

27. The method according to claim 1, which comprises adding the dopant to the powder prior to a granulation step.

28. The method according to claim 1, which comprises adding the dopant in powder form having a particle size substantially of less than 2 μm.

29. The method according to claim 1, which comprises adding a further dopant to the powder, the further dopant containing at least one compound of a substance selected from the group consisting of zirconium, cerium, yttrium, lanthanum, ytterbium, cesium, calcium, all further subgroup elements, lanthanide elements, and actinide elements, and an oxide thereof.

30. The method according to claim 1, which comprises adding to the powder a neutron poison.

31. The method according to claim 1, which comprises adding to the powder at least one neutron poison selected from the group consisting of a gadolinium compound, a boron compound, and an erbium compound.

32. The method according to claim 1, which comprises adding to the powder a lubricant.

33. The method according to claim 32, wherein the lubricant is a substance selected from the group consisting of stearate compounds, stearic acid, amide compounds, glycol compounds, and paraffin compounds.

34. The method according to claim 1, which comprises adding to the powder a pore-forming agent.

35. The method according to claim 34, wherein the pore-forming agent is a substance selected from the group consisting of ammonium salts, ammonium carbonates, acetate compounds, oxalate compounds, and sugar starch.

36. The method according to claim 1, wherein the sintering step comprises sintering the powder to approximately 93–98.5% of a theoretical density thereof.

37. The method according to claim 1, wherein the sintering step comprises sintering the powder in a reducing inert gas atmosphere.

38. The method according to claim 37, which comprises, during the sintering step, setting an oxygen partial pressure of the inert gas atmosphere such that $U_3O_8$ fractions of the powder are reduced to form $UO_2$ fractions of the powder.

39. The method according to claim 37, which comprises setting an oxygen partial pressure of the inert gas atmosphere to avoid a reduction of iron oxide fractions of the powder to form iron fractions of the powder.

* * * * *